(12) United States Patent
Deptolla

(10) Patent No.: US 6,533,351 B2
(45) Date of Patent: Mar. 18, 2003

(54) VEHICLE SEAT WITH A SEAT HEIGHT ADJUSTMENT DEVICE

(75) Inventor: Bernd Deptolla, Niedernwöhren (DE)

(73) Assignee: Faurecia Autositze GmbH & Co. KG (DE)

( * ) Notice: Subject to any disclaimer, the term of this patent is extended or adjusted under 35 U.S.C. 154(b) by 0 days.

(21) Appl. No.: 09/804,279

(22) Filed: Mar. 12, 2001

(65) Prior Publication Data

US 2001/0045766 A1 Nov. 29, 2001

(30) Foreign Application Priority Data

May 24, 2000 (DE) .......................... 100 25 675

(51) Int. Cl.⁷ ................................................ B60N 2/42
(52) U.S. Cl. ................................ 297/216.2; 297/216.1; 297/344.15
(58) Field of Search .................... 297/216.1, 216.2, 297/344.15, 473, 464

(56) References Cited

U.S. PATENT DOCUMENTS

| | | | |
|---|---|---|---|
| 3,848,923 A | * 11/1974 | Dehler | 297/366 |
| 5,346,281 A | * 9/1994 | Hughes | 297/367 |
| 5,882,080 A | * 3/1999 | Houghtaling et al. | 297/378.11 |
| 6,109,960 A | * 8/2000 | Wu et al. | 297/216.13 |
| 6,250,705 B1 | * 6/2001 | Zuch | 296/68.1 |

FOREIGN PATENT DOCUMENTS

| | | | |
|---|---|---|---|
| DE | 4120121 A1 | * | 3/1996 |
| DE | 29623024 U1 | * | 10/1997 |
| DE | 9841197 | | 3/2000 |
| DE | 9811786 | | 9/2000 |
| DE | 10025676 A1 | * | 12/2001 |
| EP | 0509865 A2 | * | 2/1996 |

\* cited by examiner

*Primary Examiner*—Peter M. Cuomo
*Assistant Examiner*—Joseph Edell
(74) *Attorney, Agent, or Firm*—Bourque & Associates, P.A.

(57) ABSTRACT

A vehicle seat frame includes a locking device that prevents the seat frame from moving during a crash. A first spring holds an inertia-sensitive locking element and an interlocking element in a first position. In the event of a crash, the inertia-sensitive locking element swivels about an axis due to the force of inertia. Contact surfaces on the inertia-sensitive locking element and the interlocking element disengage. A second spring then pulls the interlocking element toward a guide link. A gear region on the interlocking element grips into and engages with a gear region on the guide link. The second spring maintains the tension on the gear regions, even if the force of inertia has dwindled. The locking device can be disengaged only by manually resetting the interlocking element and the inertia-sensitive locking element into the first position.

7 Claims, 3 Drawing Sheets

VEHICLE SEAT WITH A SEAT HEIGHT ADJUSTMENT DEVICE

TECHNICAL FIELD

The invention concerns a vehicle seat and in particular, a vehicle seat including an inertia-sensitive element that is designed as a locking element.

BACKGROUND INFORMATION

In a vehicle seat as generally known (DE 198 41 197 A1), a spring pre-loads an inertia-sensitive element positioned on the gear side which in the event of a crash, sets a guide link. In a crash the force of inertia of the element overcomes the spring load. The guide link remains set, if the inertia exceeds the spring load. If the spring load becomes greater again, the locking is released.

During accidents, several impacts can follow each other in quick succession, whether because the vehicle skids along out of control after an accident or because one after another, several vehicles drive into each other. In such cases, the known locking devices do not help ascertain whether the locking device released after the first impact still works and whether it responds again to the subsequent impact.

Based on this state of the art, the task underlying the invention is to create a vehicle seat with a seat height adjustment device of an already known type, where the locking ability is retained after the first release.

SUMMARY OF THE INVENTION

In the proposed locking device, the seat height adjustment is blocked, until it is unlocked after the release process. Since different springs charge the interlocking element and the locking element, their dimensions can be different. The interlocking process therefore takes place very quickly due to the higher spring load, even though the release force is moderate.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
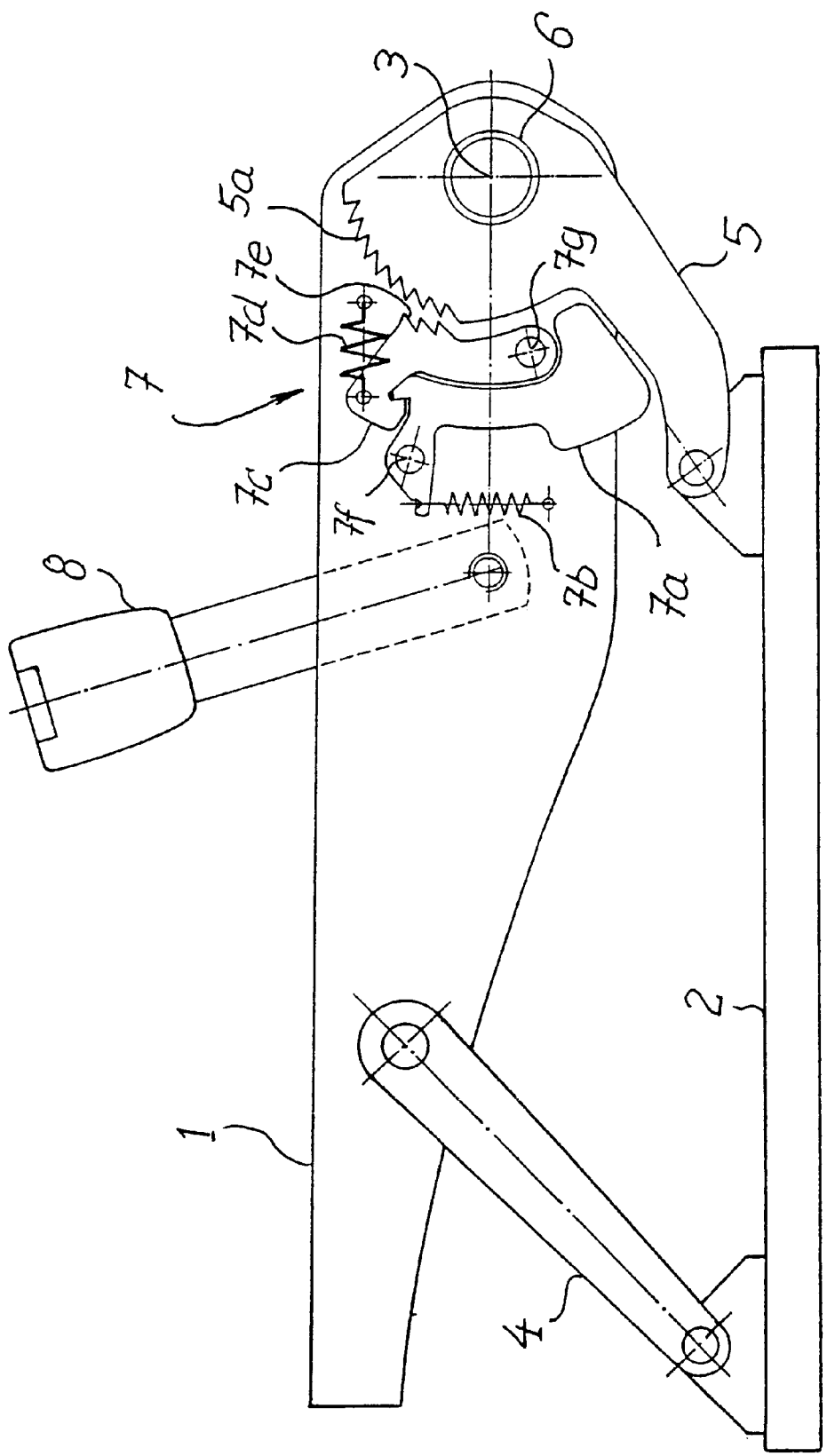
FIG. 1: A side view of a seat frame with a locking device for a seat height adjustment device according to the present invention.

The drawings show only a seat frame 1 for the vehicle seat, which connects to the longitudinal adjustment rails 2, with height adjustment by means of two parallel front and rear guide links 4, 5 respectively. The backrest supported on a locking swivel of the seat frame 1 has not been shown. The figure only shows a front guide link 4 and rear guide link 5 on the side of the seat frame 1, on which a belt lock 8 of the safety seat belt has also been fitted. The fitting (not shown) for the height adjustment with a drive unit for swiveling the rear guide link is located on the opposite side of the seat frame 1. The non-swiveling, maneuverable guide link (not shown) on the opposite side of seat frame 1 is connected with the guide link 5 parallel to it by means of connecting rod 6 rotating about an axis 3.

The guide link operated for adjusting the height is set at the selected height. In the event of a crash, a high force passes through the belt lock 8 to the side of the seat frame 1 connected with the seat belt. This force is transmitted through the connecting rod 6 to the guide link 5 fixed through the drive unit, often with unacceptable deformation. Therefore a locking device 7, activated in the event of a crash, is provided for guide link 5.

Figure 2:
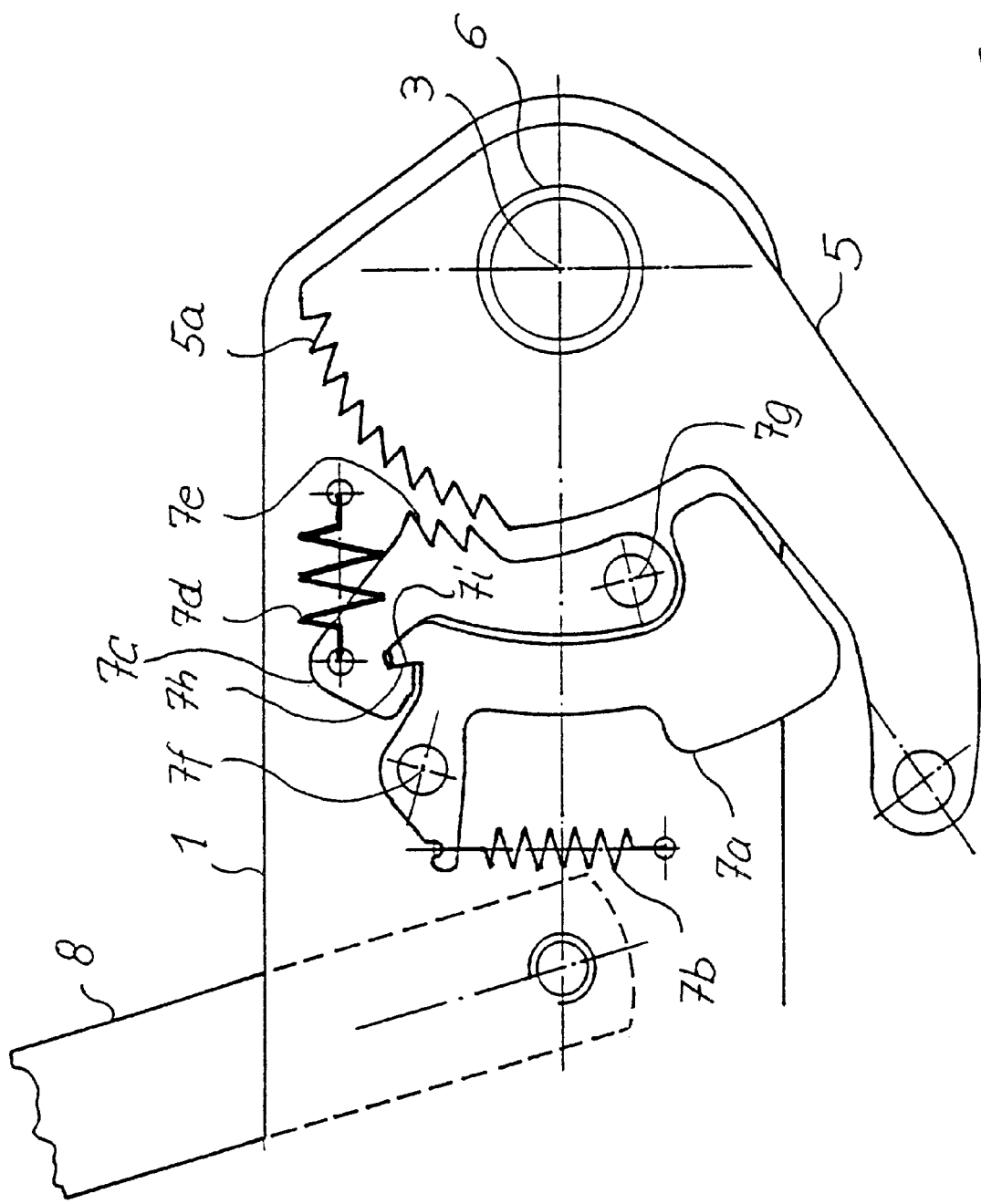
FIG. 2: A magnified view of the locking device from FIG. 1 in the unlocked condition.

The locking device 7 features an inertia-sensitive locking element 7a and an interlocking element 7c. The inertia sensitive locking element 7a and the interlocking element 7c are levers, which are supported about axes 7f and 7g respectively, which are parallel to each other and parallel to axis 3, swiveling on the seat frame 1. The locking element 7a has a surface 7h, FIG. 2, which latches on behind surface 7i on the interlocking element 7c. A spring 7b keeps surface 7h in contact with surface 7i. The interlocking element 7c has a ratchet-like saw-tooth formation 7e, and sits opposite the concentric to the axis 3 ratchet-like saw-tooth formation 5a on guide link 5 for every swivel position of the guide link. A spring 7b keeps the interlocking element 7c from engaging with the guide link 5. Spring 7d keeps the interlocking element 7c pre-loaded and facing the counter-gearing and disengaged from the saw tooth formation 5a of guide link 5.

Figure 3:
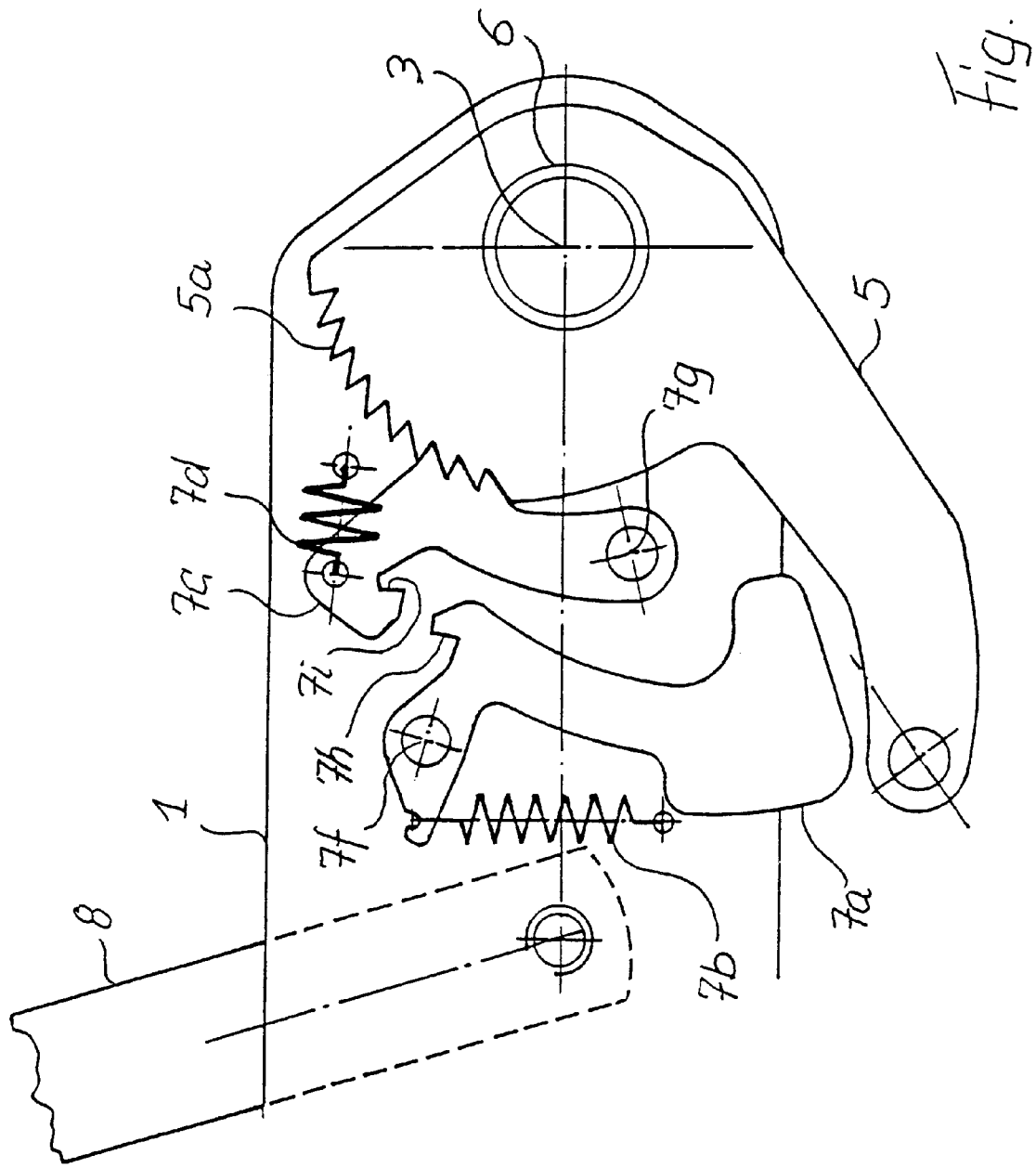
FIG. 3: A view of the locking device similar to FIG. 2, in locked condition.

In the event of a crash, the locking element 7a swivels in the clockwise direction about the axis 7f due to the force of inertia, as FIG. 3 shows. The surface 7h disengages from surface 7i and releases the interlocking element 7c. The spring 7d swivels and pulls the interlocking element 7c about the axis 7g. The saw tooth formation 7e grips into and engages with the counter gearing saw tooth formation 5a. The spring 7d maintains the tooth grip (tension) on the gearing 7e and counter-gearing 5a, even if the force of inertia has dwindled. The interlocking can be disengaged only by manually resetting the interlocking element 7c and the locking element 7a until the latching is disengaged.

Modifications and substitutions by one of ordinary skill in the art are considered to be within the scope of the present invention which is not to be limited except by the claims which follow.

The invention claimed is:

1. A locking device for a seat frame comprising:
    a first and a second guide link each having a first end adapted to be pivotably connected to a vehicle and a second end pivotably connected to said seat frame, said first guide link including a first gear region, wherein said first and said second guide link pivot about said first and said second ends such that the height of said seat frame can be altered;
    an inertia-sensitive locking element pivotably disposed about said seat frame proximate said first guide link and including a first contact surface;
    an interlocking element pivotably disposed about said seat frame between said first guide link and said inertia-sensitive locking element, said interlocking element including a second gear region and a second contact surface;
    a first spring connected to said seat frame and said inertia-sensitive locking element, whereby in a first position, said first and said second contact surface engage each other and said first spring biases against said inertia-sensitive, locking element keeping said inertia-sensitive locking element and said interlocking element disposed in said first position; and a second spring connected to said seat frame and said interlocking element, wherein upon an inertial input, said inertia-sensitive locking element rotates such that said first and said second contact surface disengage and said second spring rotates said interlocking element and engages said first and said second gear region such that said seat frame cannot move.

2. The locking device according to claim 1, wherein said first gear region includes a ratchet gear for engaging with a corresponding ratchet gear disposed on said first guide link.

3. The locking device according to claim 2 wherein said interlocking element and said inertia-sensitive locking element have surfaces designed for mutual latching and engagement.

4. The locking device according to claim 2 wherein said ratchet gear on said first guide link is designed as a curved saw tooth arrangement arranged on one edge of said first guide link.

5. The locking device according to claim 4 wherein said curved saw tooth arrangement traces a path about an axis of said first guide link with a generally constant radius.

6. The locking device according to claim 1, wherein said interlocking element and said inertia-sensitive locking element are designed as levers and pivot about a first and a second parallel axis respectively.

7. The locking device according to claim 1 wherein said interlocking element and said first guide link include interlocking meshing teeth designed in a saw-tooth form.

* * * * *